United States Patent [19]

Paget

[11] 3,759,921
[45] Sept. 18, 1973

[54] METHOD OF SUPPRESSING IMMUNERESPONSE WITH 1 SUBSTITUTED-3-(2 PYRIMIDYL)UREAS

[75] Inventor: Charles J. Paget, Indianapolis, Ind.

[73] Assignee: Eli Lilly and Company, Indianapolis, Ind.

[22] Filed: June 9, 1971

[21] Appl. No.: 151,540

Related U.S. Application Data

[63] Continuation-in-part of Ser. No. 867,079, Oct. 16, 1969, abandoned.

[52] U.S. Cl............. 424/251, 260/256.4, 260/256.5
[51] Int. Cl............................................. A61k 27/00
[58] Field of Search..................................... 424/251

[56] References Cited
OTHER PUBLICATIONS

Buu–Hoi, J. Chem. Soc., 1958, pages 2815–2821
Science News, Vol. 94, page 319, Sept. 28, 1968
Urbanski et al., Journal of Medicinal Chemistry, Vol. 10, pages 521–525, 1967

Primary Examiner—Richard L. Huff
Attorney—Everet F. Smith and Kathleen R. Schmoyer

[57] ABSTRACT

1-Substituted-3-(2-pyrimidyl)ureas as immunosuppressants and as antiviral agents.

3 Claims, No Drawings

METHOD OF SUPPRESSING IMMUNERESPONSE WITH 1 SUBSTITUTED-3-(2 PYRIMIDYL)UREAS

CROSS-REFERENCE TO RELATED APPLICATION

This is a continuation-in-part of my copending application Ser. No. 867,079, filed Oct. 16, 1969 now abandoned.

BACKGROUND OF THE INVENTION

Recently, immunosuppressant agents have come into prominence because of their use incident to transplants of organs from one human to another, especially heart transplants and kidney transplants. It is part of the defense mechanism of humans to remove foreign antigens (in this case, the transplanted organ) by the immune reaction. Thus, in all of the organ transplant operations, it has been necessary to give large doses of an immunosuppressant prior to the operation and continuing thereafter in order to prevent the host from rejecting the donor organ. The immunosuppressant of choice has been azathiaprene (U.S. Pat. No. 3,056,785).

SUMMARY OF THE INVENTION

The present invention is concerned most broadly with compounds of the formula:

I.
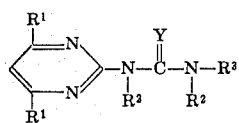

In the above and succeeding formulae throughout the present specification,
each $R^1$ independently represents hydrogen, chloro, or loweralkyl of $C_1$–$C_3$;
each $R^2$ independently represents hydrogen or loweralkyl of $C_1$–$C_3$;
Y represents S or O;
$R^3$ represents cycloalkyl of $C_5$–$C_8$, naphthyl, phenyl, or substituted phenyl of the formula:

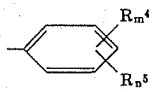

wherein each $R_4$ independently represents halo, loweralkyl of $C_1$–$C_3$, or loweralkoxy of $C_1$–$C_3$; $R^5$ represents cyano, trifluoromethyl, or nitro; m represents an integer of from 0 to 2, both inclusive; and n represents an integer of from 0 to 1, both inclusive, the sum of m and n being 1 or 2. In the present specification and claims, the term "halo" is used to refer to chloro, bromo, fluoro, and iodo, only.

All of the compounds as thus defined are useful as immunosuppressants and as antiviral agents. Accordingly, the present invention is directed in part to a method for preventing infection of a mammal subject to attack by Coe virus which method comprises the step of administering the mammal an effective dose within the range of from 0.01 to 1,000 milligrams of an active agent as above defined per kilogram of mammal body weight.

For immunosuppression, certain compounds within the broad definition are preferred. Accordingly, the present invention is directed, in another part, to a method for lowering the efficiency of defense by a host mammal against a substance recognized as a foreign substance and reacted to immunologically which comprises the step of administering parenterally to the mammal an effective dose within the range of from 0.5 to 400 milligrams of an active agent per kilogram of mammal body weight, said active agent being a compound of the formula

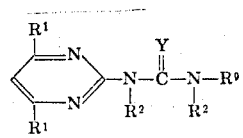

wherein
each $R^1$ independently represents hydrogen, chloro, or loweralkyl of $C_1$–$C_3$;
each $R^2$ independently represents hydrogen or loweralkyl of $C_1$–$C_4$;
Y represents S or O;
$R^9$ represents cycloalkyl of $C_5$–$C_8$, phenyl, nitrophenyl, (trifluoromethyl)phenyl, cyanophenyl, m-tolyl, o-tolyl, p-fluorophenyl, m-chlorophenyl, 2,5-dichlorophenyl, or 3,4-dichlorophenyl.

In addition, the present invention is also directed to certain novel compounds within the scope of the above active agent. The compounds so claimed are those of the formula

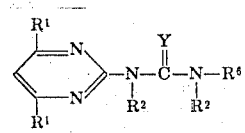

wherein $R^6$ represents cycloalkyl of $C_5$–$C_8$, naphthyl, or substituted phenyl of the formula

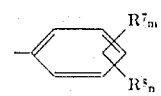

wherein $R^7$ represents loweralkyl of $C_1$–$C_3$ or loweralkoxy of $C_1$–$C_3$; $R^8$ represents cyano or trifluoromethyl; and $R^1$, $R^2$, Y, m and n are employed as defined above.

DETAILED DESCRIPTION OF THE INVENTION

All of the compounds of the present invention are prepared by reacting a 2-aminopyrimidine compound of the formula

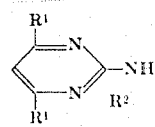

with a carbamoyl chloride or thiocarbamoyl chloride of the formula

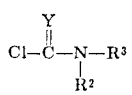

Additionally, those compounds of the present invention which are of the formula

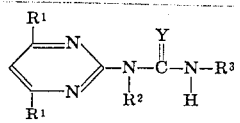

can also be prepared by reacting a 2-aminopyrimidine, as above defined, with an isocyanate or isothiocyanate of the formula

In carrying out the former reaction of 2-aminopyrimidine and the carbamoyl chloride or thiocarbamoyl chloride, the reactants are combined with another, conveniently in the presence of an inert solvent as reaction medium, and necessarily in the presence of a hydrogen chloride acceptor—such as an organic tertiary amine. The reaction goes forward readily at temperatures over a wide range, such as from 0°C. or less to reflux temperatures. It is preferably conducted by mixing the reactants at room temperatures and heating the reaction mixture to reflux. The reaction results in the preparation of the desired product in good yield, with the hydrochloride salt of the acceptor as by-product. Separation, and if desired purification, are carried out in conventional procedures.

In the second synthetic procedure, the 2-aminopyrimidine and isocyanate or isothiocyanate are mixed with one another, conveniently in the presence of an inert solvent as reaction medium. The reaction goes forward readily at temperatures of from room temperatures to reflux, but is conveniently conducted at reflux. Separation, and if desired purification, are carried out in conventional procedures.

The following examples illustrate the synthesis of compounds of the present invention.

EXAMPLE 1: 1-NAPHTHYL-3-(2-PYRIMIDYL)UREA

In 150 milliliters of toluene, 2-aminopyrimidine (2.87 grams; 0.03 mole) and 1-naphthyl isocyanate (5.6 grams; 0.03 mole) were mixed, and the mixture heated to reflux and refluxed for 8 hours with stirring. The reaction mixture was then cooled and filtered to separate the desired 1-naphthyl-3-(2-pyrimidyl)urea product as a solid, m.p., 246°–48°C.

EXAMPLES 2-38

Other representative products of the present invention prepared in accordance with the foregoing example and teachings are listed in the following table, in which "m.p." is used as an abbreviation of the term "melting point," and "m.w.," as an abbreviation of the term "molecular weight."

TABLE 1

| Compound | Characterizing Property |
|---|---|
| 1-(m-(Trifluoromethyl)phenyl)-3-(m-(Trifluoromethyl)phenyl)-2-pyrimidyl)urea | m.p., 223°–24°C. |
| 1-(p-Nitrophenyl)-3-(2-pyrimidyl)-urea | m.p., 268°–70°C. |
| 1-Phenyl-3-(2-pyrimidyl)urea | m.p., 221°–22°C. |
| 1-Phenyl-1-methyl-3-(2-pyrimidyl)-thiourea | m.w., 244.3 |
| 1-(5-(Trifluoromethyl)-m-tolyl)-3-(2-pyrimidyl)urea | m.w., 296.3 |
| 1-Phenyl-1,3-dimethyl-3-(2-pyrimidyl)-urea | m.w., 242.3 |
| 1-(3,4-Dichlorophenyl)-3-(2-pyrimidyl)-urea | m.p., 240°–41°C. |
| 1-(m-Tolyl)-3-(2-pyrimidyl)urea | m.p., 187°–88°C. |
| 1-(o-Nitrophenyl)-3-(2-pyrimidyl)urea | m.p., 264°–65°C. |
| 1-Cyclohexyl-3-(2-pyrimidyl)urea | m.p., 150°–51°C. |
| 1-Cyclohexyl-3-ethyl-3-(2-pyrimidyl)urea a | m.w., 248.3 |
| 1-(p-Cyanophenyl)-3-(2-pyrimidyl)urea | m.p., 273°–74°C. |
| 1-(p-Fluorophenyl)-3-(2-pyrimidyl)urea | m.p., 244°–45°C. |
| 1-Phenyl-3-(4,6-dichloro-2-pyrimidyl)thiourea | m.w., 299.2 |
| 1-(o-Fluorophenyl)-3-(2-pyrimidyl)urea | m.p., 218°–19°C. |
| 1-(2,5-Dichlorophenyl)-3-(2-pyrimidyl)urea | m.p., 314°–18°C. |
| 1-(p-n-Propylphenyl)-3-(2-pyrimidyl)thiourea | m.w., 272.4 |
| 1-(o-Tolyl)-3-(2-pyrimidyl)urea | m.p., 214°–15°C. |
| 1-(p-Iodophenyl)-3-(2-pyrimidyl)urea | m.w., 340.1 |
| 1-(p-Tolyl)-3-(2-pyrimidyl)urea | m.p., 205°–06° C. |
| 1-(p-Nitrophenyl)-3-(4,6-dimethyl-2-pyrimidyl)urea | m.w., 287.3 |
| 1-(3,5-Xylyl)-3-(3-pyrimidyl)urea | m.w., 242.3 |
| 1-(o-Methoxyphenyl)-3-(2-pyrimidyl)urea | m.p., 222°–24°C. |
| 1-(m-(Trifluoromethyl)pheyl)-3-(4-chloro-6-isopropyl-2-pyrimidyl)urea | m.w., 358.8 |
| 1-(o-Ethoxyphenyl)-3-(2-pyrimidyl)urea | m.p., 248°–49°C. |
| 1-(p-Isopropylphenyl)-1-n-propyl-3-(4,6-dichloro-2-pyrimidyl)urea | m.w., 367.3 |
| 1-(m-(Trifluoromethyl)phenyl)-3-(2-pyrimidyl)thiourea | m.p., 205°–07°C. |
| 1-Cyclopentyl-3-(2-pyrimidyl)urea | m.w., 206.3 |
| 1-Cyclooctyl-3-(2-pyrimidyl)thiourea | m.w., 264.4 |
| 1-(m-Nitrophenyl)-3-(2-pyrimidyl)urea | m.p., 259°–61°C. |
| 1-(4-Nitro-o-tolyl)-3-(2-pyrimidyl)thiourea | m.w., 289.3 |
| 1-(m-Chlorophenyl)-3-(2-pyrimidyl)urea | m.p., 231°–32°C. |
| 1-(m-(Trifluoromethyl)phenyl)-3-n-butyl-3-(2-pyrimidyl)urea | m.w., 338.3 |
| 1-Phenyl-3-(4-chloro-6-methyl-2-pyrimidyl)urea | m.p., 156°–57°C. |
| 1-(3-Bromo-5-isopropoxyphenyl)-3-(2-pyrimidyl)urea | m.w., 351.2 |
| 1-Naphthyl-3-(4-chloro-6-methyl-2-pyrimidyl)urea | m.p., 204°–05°C. |
| 1-(p-Nitrophenyl)-1-isopropyl-3-(2-pyrimidyl)thiourea | m.w., 303.3 |

As stated hereinabove, the compounds of the present invention are useful in suppressing the immune reaction in mammals. Such suppression includes the suppression of immune response engendered whenever the mammalian body forms antibodies in response to the presence of the foreign protein. Thus, immunosuppressant activity can also be characterized as anti-allergic. The practical application of immunosuppressant activity is varied. As noted above, a prominent application of immunosuppressant activity is in the transplanting of organs; but immunosuppressant activity can also be advantageously employed in the therapy of the various diseases known collectively as "auto-immune" diseases. Although the etiology of these diseases is little understood, it is generally believed that an immune reaction is involved. Representative such auto-immune diseases include auto-immune hemolytic anemia, idiopathic thrombocytopenic purpura, lupus erythematosus, lupoid hepatitis, lupus nephritis, glomerulonephritis, the nephrotic syndrome, Goodpasture's syndrome, Wegener's granulomatosis, schleroderma, Sezary's disease, psoriasis, uveitis, rheumatoid arthritis, ulcerative colitis, thyroiditis and mumps orchitis.

In implementing the present immunosuppressant activity, it has been found to be necessary that the compounds be administered parenterally. The dose of a compound or compounds administered is not critical; in general, though, dosage rates of from 0.5 to 400 milligrams per kilogram of mammal body weight give good results. The administration of the compounds is preferably achieved by formulating the compound in an injectable solution—conveniently a physiological saline solution containing one or more of the compounds of the present invention. Methods and procedures for preparing such injectable solutions, and techniques for administering them, are well known in the prior art.

The ability of the compounds of the present invention to suppress immune mechanisms in a host animal was measured by their activity as anti-allergic agents according to the following test. Groups of five 20-gram Swiss mice were each injected intraperitoneally with standardized suspensions of an antigen—in this instance sheep blood cells. The compounds were also injected by the intraperitoneal route at various times before and/or after the injection of the sheep blood cells for a total of three injections of the same amount of compound on each occasion. Eight days after injection of the antigen, the mice were bled and the sera from each group pooled. Antibody determinations were made on the serum pools by a hemaglutination pattern procedure and comparisons made between treated and control animals. The activity of the compounds is given in the following table in terms of the minimum dose of drug administered on each of three occasions that was necessary to suppress the hemaglutination titer by a four-fold factor in the treated mice as compared with control titers.

TABLE 2

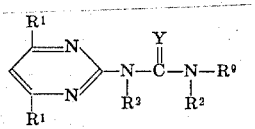

| $R^1$ | $R^2$ | Y | $R^9$ | Dose in mg./kg. × 3 for Four-fold or Greater Suppression |
|---|---|---|---|---|
| H | H | O | m-CF$_3$C$_6$H$_4$ | 12.5 |
| H | H | O | p-NO$_2$C$_6$H$_4$ | 12.5 |
| H | H | O | C$_6$H$_5$ | 50.0 |
| H | H | O | 3,4-Cl$_2$C$_6$H$_3$ | 50.0 |
| H | H | O | m-CH$_3$C$_6$H$_4$ | 50.0 |
| H | H | O | o-NO$_2$C$_6$H$_4$ | 50.0 |
| H | H | O | C$_6$H$_{11}$ | 100.0 |
| H | H | O | p-CNC$_6$H$_4$ | 100.0 |
| H | H | O | p-FC$_6$H$_4$ | 200.0 |
| H | H | O | 2,5-Cl$_2$C$_6$H$_3$ | 100.0 |
| H | H | O | o-CH$_3$C$_6$H$_4$ | 100.0 |
| H | H | O | m-NO$_2$C$_6$H$_4$ | 200.0 |
| H | H | O | m-ClC$_6$H$_4$ | 200.0 |
| 4-CH$_3$, 6-Cl | H | O | 1-C$_{10}$H$_7$ | 100.0 |
| Azathioprene | | | | 100.0 |

As previously stated, the compounds of the present invention are also useful in combatting infections of viral origin in mammals, in particular in combatting infections due to the Coe virus. In accordance with this embodiment of the present invention, there is administered to a mammal subject to attack by Coe virus an effective dose within the range of from 0.01 to 1,000 milligrams thereof per kilogram of mammal body weight. As in the instance of the embodiment of the present invention in immunosuppression, it is necessary that the compounds be administered parenterally, and the comments hereinabove regarding the preparation of suitable formulations are equally applicable.

This embodiment of the present invention is illustrated by a test procedure involving mice infected with Coxsacki A21 (Coe) virus. This virus was isolated by Lanette et al., Am. J. Hyg. 68, 2727 (1959), from human patients with mild respiratory illness. In mice, the virus produces muscle degeneration and flaccid paralysis as well as respiratory involvement. Table 3, which follows, gives for the compounds listed therein, the ED$_{50}$ (effective dose for protecting 50 percent of the animals from the effects of administered virus at levels which produce lethal infections in 90–100 percent of the mice) when the drug is given intraperitoneally in unit dosage form to mice 3 hours before injection of the virus. The mouse-adapted Coxsacki A21 virus employed is usually in the form of a 1:10 dilution of the supernate of a 10 percent mouse gluteal muscle (obtained from infected mice) suspension. The LD$_{50}$ of the suspension was determined in each case by titration in mice. The compounds were administered to the mice as suspensions in 0.25 ml. of a sterile water (permissibly containing up to 3 percent of a non-ionic surfactant) at a series of dose levels from which the ED$_{50}$ could be determined. The mice employed were SPF white Swiss mice weighing 11–13 grams. Ten mice were used for each drug level, and three–five groups of 10 mice each were used as controls. In this procedure, the control mice usually die on the fifth to eighth day after infection, and animals alive through the 10th day are considered survivors if free of paralysis. The ED$_{50}$ given in the tables were calculated by the method of Reed and Muench, Am. J. Hyg. 27, 493 (1938).

In Table 3, a dash indicates that the compound was not active at the highest dose tested, usually 128 mg./kg. in the anti-viral test, but presumably would be active at higher dose levels.

TABLE 3

| $R^1$ | $R^2$ | Y | $R^3$ | ED$_{50}$ mg./kg. |
|---|---|---|---|---|
| H | H | O | m-CF$_3$C$_6$H$_4$ | 76 |
| H | H | O | p-NO$_2$C$_6$H$_4$ | 128 |
| H | H | O | C$_6$H$_5$ | |
| H | H | O | 3,4-Cl$_2$C$_6$H$_3$ | 20 |
| H | H | O | m-CH$_3$C$_6$H$_4$ | |
| H | H | O | o-NO$_2$C$_6$H$_4$ | 84 |
| H | H | O | C$_6$H$_{11}$ | |
| H | H | O | p-CNC$_6$H$_4$ | 114 |
| H | H | O | p-FC$_6$H$_4$ | 104 |
| H | H | O | o-FC$_6$H$_4$ | |
| H | H | O | 2,5-Cl$_2$C$_6$H$_3$ | 22 |
| H | H | O | o-CH$_3$C$_6$H$_4$ | 118 |
| H | H | O | p-CH$_3$C$_6$H$_4$ | |
| H | H | O | 1-C$_{10}$H$_7$ | 84 |
| H | H | O | m-NO$_2$C$_6$H$_4$ | 31 |
| H | H | O | o-CH$_3$OC$_6$H$_4$ | |
| H | H | O | o-C$_2$H$_5$OC$_6$H$_4$ | 34 |
| H | H | O | m-ClC$_6$H$_4$ | 26 |
| 4-CH$_3$, 6-Cl | H | O | 1-C$_{10}$H$_7$ | 106 |

Essentially like results are obtained when evaluating the other of the compounds identified hereinabove as Examples 1–38 in the same test.

Many of the starting materials to be employed in accordance with the present invention are known compounds, and all of the same are prepared in known procedures. All of the 2-aminopyrimidine starting materials:

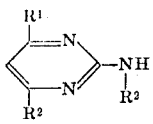

are synthesized in accordance with methods, taught at page 188 in Chemistry of Heterocyclic Compounds: The Pyrimidines (Interscience Publishers, 1962).

I claim:
1. A method for suppressing the immune response of a mammal which comprises the step of administering parenterally to a mammal with a transplanted organ an effective dose within the range of from 0.5 to 400 milligrams of an active agent per kilogram of mammal body weight, said active agent being a compound of the formula:

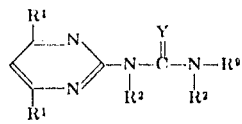

wherein
each $R^1$ independently represents hydrogen, chloro, or loweralkyl of $C_1-C_3$;
each $R^2$ independently represents hydrogen or loweralkyl of $C_1-C_4$;
Y represents S or O;
$R^9$ represents cycloalkyl of $C_5-C_8$, phenyl, nitrophenyl, (trifluoromethyl)phenyl, cyanophenyl, m-tolyl, o-tolyl, p-fluorophenyl, m-chlorophenyl, 2,5-dichlorophenyl, or 3,4-dichlorophenyl.

2. The method of claim 1 wherein the active agent is 1-(2-pyrimidyl)-3-(m-(trifluoromethyl)phenyl)urea.

3. The method of claim 1 wherein the active agent is 1-(2-pyrimidyl)-3-(p-nitrophenyl)urea.

* * * * *